US010197702B2

(12) United States Patent
Du et al.

(10) Patent No.: US 10,197,702 B2
(45) Date of Patent: Feb. 5, 2019

(54) SEISMIC GUIDED INVERSION OF ELECTROMAGNETIC SURVEY DATA

(71) Applicant: PGS Geophysical AS, Oslo (NO)

(72) Inventors: Zhijun Du, Weybridge (GB); Md. Anwar Hossain Bhuiyan, Oslo (NO); Eivind Rødnes Vesterås, Oslo (NO); Allan John McKay, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 322 days.

(21) Appl. No.: 15/092,786

(22) Filed: Apr. 7, 2016

(65) Prior Publication Data

US 2016/0313468 A1  Oct. 27, 2016

Related U.S. Application Data

(60) Provisional application No. 62/153,084, filed on Apr. 27, 2015.

(51) Int. Cl.
  *G01V 1/28* (2006.01)
  *G01V 11/00* (2006.01)
  *G01V 3/08* (2006.01)

(52) U.S. Cl.
  CPC .............. *G01V 11/00* (2013.01); *G01V 1/28* (2013.01); *G01V 3/083* (2013.01)

(58) Field of Classification Search
  CPC ................... G01V 2003/086; G01V 11/007
  See application file for complete search history.

(56) References Cited

U.S. PATENT DOCUMENTS

| 5,870,690 A | 2/1999 | Frenkel et al. |
| 7,328,107 B2 | 2/2008 | Strack et al. |
| 8,279,903 B2 | 10/2012 | Shah et al. |
| 2007/0255499 A1* | 11/2007 | Strack .................. G01V 11/00 702/11 |

OTHER PUBLICATIONS

Virgilio et al., "Simultaneous Joint Inversion of Seismic, Gravity, and EM Data for Subsalt Depth Imaging in Gulf of Mexico," Jun. 2010, 5 pages.

* cited by examiner

*Primary Examiner* — Cheung Lee
(74) *Attorney, Agent, or Firm* — Patterson & Sheridan, LLP

(57) ABSTRACT

Methods of forming a geologic map usable for identifying prospective resource accumulations beneath the earth-surface are disclosed herein. The methods include obtaining a seismic stratigraphic structure of a subsurface region of the earth, determining a plurality of potential resistivity boundaries from the seismic stratigraphic structure, obtaining an electromagnetic data set resulting from an electromagnetic data acquisition of the subsurface region, recovering a resistivity map of the subsurface region by performing an inversion process guided by the seismic information, and resolving a geologic map from the resistivity map.

26 Claims, 5 Drawing Sheets

SEISMIC GUIDED INVERSION OF ELECTROMAGNETIC SURVEY DATA

CROSS-REFERENCE TO RELATED APPLICATIONS

This application claims benefit of U.S. Provisional Patent Application Ser. No. 62/153,804 filed Apr. 27, 2015, which is incorporated herein by reference.

BACKGROUND

Certain aspects of the present disclosure generally relate to the field of geophysical surveying and may have particular applicability to electromagnetic (EM) and seismic surveying in marine or other settings.

In geophysical prospecting in a marine environment, sources and receivers are used to understand the geology of the earth below the water. In a particular surveying method, sources of electromagnetic or seismic fields are deployed according to a desired arrangement to direct energy toward the earth. The energy interacts with structures and materials in the earth, and the interaction changes the energy according to properties of the structures and materials. The changed energy is detected by receivers, which record data representing the changed energy. The data is then analyzed to understand the properties of the earth. The electromagnetic or seismic energy may take the form of a diffusive field and/or a wave field that propagates through the water and into the earth. The changed energy also typically propagates as a diffusive field and/or a wave field. The sources and receivers may be stand-alone devices, or may be arranged in elongated assemblies. The assemblies may be towed behind a vessel, or may be stationary in the water or on the sea floor. In particular, receiver assemblies that are towed behind a vessel are referred to as "towed streamers." An electromagnetic survey employing towed streamers is referred to as a "towed streamer electromagnetic survey."

In order to understand properties of the materials and structures in the earth, a model may be used to derive the properties from the recorded data. In the case of electromagnetic surveying, the recorded data are typically voltages, and these voltages, related to characteristics of the source energy and the geometry of the source and receiver arrangement, indicate the transformation of the energy by the structures and materials in the earth. The transformation, in turn, indicates physical properties of the materials, such as resistivity, magnetic permeability, density, and other physical properties. In the case of seismic surveying, the recorded data are typically pressures, which indicate the variations of physical properties of the subsurface materials, such as seismic pressure-wave or shear-wave velocities. Using a physical model that relates such physical properties to transformations in electromagnetic or seismic radiation, diffusion, or dispersion, the physical parameters can be iteratively determined by computing results from the model based on a representation of the known source energy, the geometry of the survey, and estimates of the physical properties. Agreement of the model results with the detected energy indicates the accuracy of the estimate, and if such accuracy is inadequate, the estimate is refined until a desired accuracy is reached. This iterative refining process seeking physical models that optimally fit the recorded data is typically referred to as "inversion." In some circumstances, anisotropy, dependence of a geophysical property on direction, of the subsurface earth has to be taken into account. For instance, instead of inverting only one resistivity model, anisotropic electromagnetic inversions frequently aim at inverting two or more models, such as vertical resistivity and horizontal resistivity (also known as Vertical Transverse Isotropic or "VTI" modeling where bedding planes are modeled as horizontal) or a more general resistivity model incorporating a tilted axis of symmetry (also known as Tilted Transverse Isotropic or "TTI" modeling where bedding planes are not horizontal), to better approximate the recorded data. Inversions taking into account anisotropy are typically referred to as "anisotropic inversions."

Various electromagnetic inversion techniques seeking the best resistivity model that optimally fits the recorded electromagnetic data are conventionally exploited. The inverted resistivity models are typically of low resolution, due to the inherent low frequency nature of the recorded electromagnetic data and the nature of the electromagnetic field diffusion. In contrast, broadband seismic data typically provides a high resolution structural image of the subsurface, namely, a seismic stratigraphic structure, after iterative seismic inversion processes, or even through direct imaging processes. Because both resistivity and seismic stratigraphic structure describe physical properties of the same subsurface region, their boundaries should roughly align with each other. In other words, the inverted resistivity model is expected to possess imprints identifiable in the seismic stratigraphic structure. Due to the contrasting resolution of electromagnetic inversion and seismic images or sub-surface properties determined from the seismic data, such matching is often lacking.

Therefore, techniques for integrating electromagnetic inversions and seismic stratigraphic structures are needed.

BRIEF DESCRIPTION OF THE DRAWINGS

So that the manner in which the features of the present disclosure can be understood in detail, a description of the disclosure may be had by reference to aspects, some of which are illustrated in the appended drawings. It is to be noted, however, that the appended drawings illustrate only typical aspects of the disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
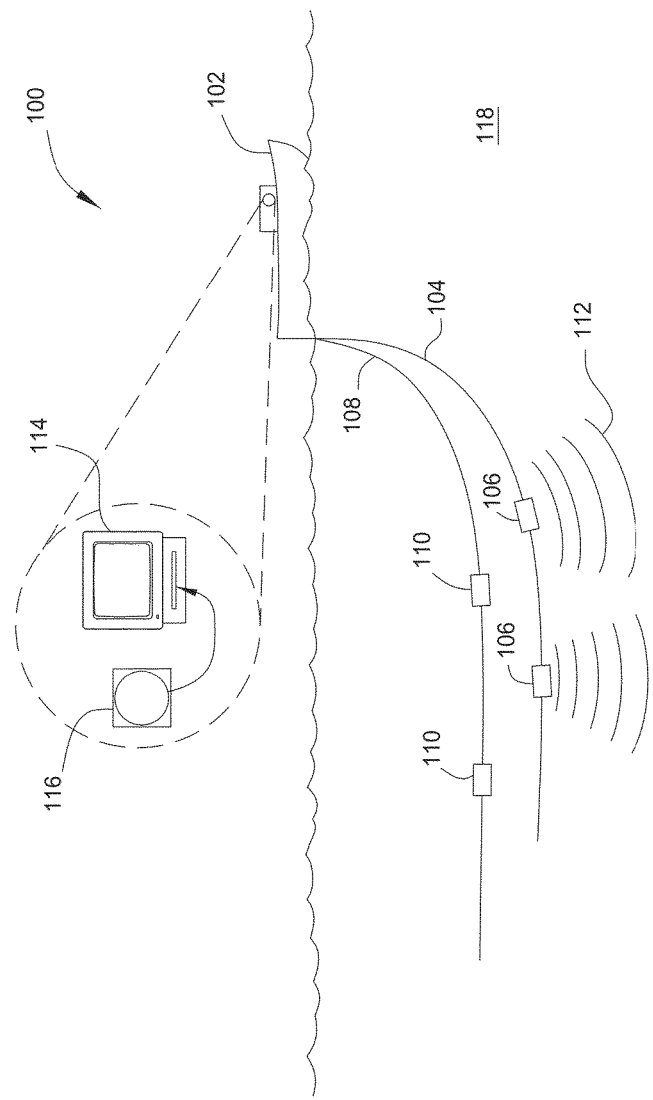
FIG. 1 is an example activity diagram showing a data acquisition scheme in a marine context.

Embodiments described herein provide a method of forming a geologic map, comprising obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; recovering a resistivity map of the subsurface region by performing an inversion process on the electromagnetic data set, the inversion process comprising: entering the electromagnetic data set into a computer processing system; performing a plurality of inversion iterations using the computer processing system; and during at least one iteration, using one or more of the plurality of resistivity boundaries determined from the seismic stratigraphic structure to confine the resistivity map; and resolving a geologic map from the resistivity map.

Other embodiments provide a method of forming a geologic map, comprising: obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; entering the electromagnetic data set into a computer processing system; recovering a first resistivity map of the subsurface region from the electromagnetic data set by performing a first inversion process using the computer processing system; recovering a second resistivity map of the subsurface region from the first resistivity map by performing a second inversion process on the first resistivity map using the computer processing system, the second inversion process comprising: performing a plurality of inversion iterations; and during at least one iteration, using one or more of the plurality of resistivity boundaries determined from the seismic stratigraphic structure to confine the resistivity map; and resolving a geologic map usable for identifying prospective resource accumulations from the second resistivity map.

Other embodiments provide a geologic map product, obtained by a process comprising: obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; recovering a resistivity map of the subsurface region by performing an inversion process on the electromagnetic data set, the inversion process comprising: entering the electromagnetic data set into a computer processing system; performing a plurality of inversion iterations using the computer processing system; and during at least one iteration, using one or more of the plurality of resistivity boundaries determined from the seismic stratigraphic structure to confine the resistivity map; resolving a geologic map usable for identifying prospective resource accumulations from the resistivity map; and forming a geologic map product containing a representation of the geologic map.

Other embodiments provide a geologic map product for identifying prospective resource accumulations beneath the earth, the geologic map product obtained by a process comprising: obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; entering the electromagnetic data set into a computer processing system; recovering a first resistivity map of the subsurface region from the electromagnetic data set by performing a first inversion process using the computer processing system; recovering a second resistivity map of the subsurface region from the first resistivity map by performing a second inversion process on the first resistivity map using the computer processing system, the second inversion process comprising: performing a plurality of inversion iterations; and during at least one iteration, using one or more of the plurality of resistivity boundaries determined from the seismic stratigraphic structure to confine the resistivity map; resolving a geologic map from the second resistivity map; and forming a geologic map product containing a representation of the geologic map.

It is to be understood the present disclosure is not limited to particular devices or methods, which may, of course, vary. It is also to be understood that the terminology used herein is for the purpose of describing particular aspects only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." Terms such as "coupled", "coupling", and "couplable" refer to being directly or indirectly connected.

This disclosure may have applications in marine surveying, in which one or more energy sources are used to generate fields, and sensors—either towed or ocean bottom—receive energy generated by the sources and affected by the interaction with the subsurface formations. Likewise, this disclosure may have applications in marine electromagnetic (EM) surveying, in which one or more EM field sources are used to generate EM fields, and EM sensors—either towed or ocean bottom—receive EM energy generated by the EM sources and affected by the interaction with the subsurface formations.

FIG. 1 is an example activity diagram showing a data acquisition scheme 100 in a marine context. The data acquisition scheme 100 is one way to collect geophysical data for use in an inversion process to determine structures and materials of the earth below the water. A vessel 102 tows one or more source assemblies 104, each having one or more energy sources 106, and one or more receiver assemblies 108, each having one or more receivers 110. In alternate configurations, one or more of the source assemblies 104 and/or the receiver assemblies 108 may be stationary in the water or on the sea floor. Source assemblies 104 may consist of merely seismic source assemblies, merely electromagnetic source assemblies, or both seismic and electromagnetic source assemblies. Likewise, correspondingly, receiver assemblies 108 may consist of merely seismic receiver assemblies, merely electromagnetic receiver assemblies, or both seismic and electromagnetic receiver assemblies.

An electromagnetic (EM) source may have pairs of spaced apart electrodes which are energized by electric current to produce an electric field, which may be an electromagnetic field in some embodiments, for example where the electric current applied to the electrodes is caused to vary in some way. An electromagnetic source may also be a loop through which an electric current is passed to induce a magnetic field, which may also be an electromagnetic field if the electric current is caused to vary. A receiver used for EM surveying may include one or more spaced apart pairs of electrodes, where each pair of electrodes may be coupled across the input terminals of a proximately positioned signal amplifier. An EM receiver may also include a loop in which a detected magnetic field may induce an electric current. An EM receiver assembly may also include signal digitization and electrical to optical signal conversion devices (not shown separately in FIG. 1). Optical transmission is sometimes used instead of electrical transmission to avoid generating unwanted electromagnetic fields from the transmissions. Such sources and receivers may be used in any desired combination or arrangement. Where this disclosure refers to "sources" and "receivers," it is to be understood that the methods described herein are equally applicable to embodiments with only one source or only one receiver, and vice versa.

EM sources used in the configuration shown in FIG. 1 may induce horizontal dipole electric fields, vertical dipole electric fields, horizontal magnetic fields, and/or vertical magnetic fields in the subsurface. The fields may be constant or varying, and may include electric, magnetic, and electromagnetic fields.

In the marine context, the source 106 emits energy 112 that propagates through the water and may interact with various surfaces of water 118 and earth to produce an energy signature. The one or more receivers 110 may detect the energy signature, and may record the energy signature as data, for example voltages. The data collected from the one or more receivers 110, depicting real-world energy signatures from the physical environment, forms a primary record of the energy signatures that may be represented and stored in a computer 114 or on a computer readable medium 116 that may be inserted into, or otherwise connected to, the computer 114 for storing the data. The computer readable medium 116, which is not a transitory signal medium, may contain the raw data collected from the one or more receivers 110 or a data product made by processing the raw data. Computer readable media that may store various aspects include rotationally operated magnetoresistive memory devices such as floppy disks, hard disks, stationary magnetoresistive memory devices such as flash drives, and optical disks. As for the electromagnetic data acquisition of the subsurface region of the earth, in one embodiment, a towed streamer controlled-source electromagnetic (CSEM) data acquisition survey is adopted, in which a specially coded broadband source function propagates an electromagnetic field that penetrates the earth. In the embodiment of electromagnetic surveying, the one or more receivers 110 include highly sensitive receiver electrodes housed in the assemblies 108 detect the fluctuations in the field from which subsurface resistivity anomalies can be derived.

In a typical geophysical survey process, the source and/or receiver assemblies 104, 108 may be towed by the vessel 102 at a selected velocity. The sources 106 may be energized at selected times to provide energy impulses at different locations along the tow line. The receivers 110 record data for each energy impulse over a geographic area, so that each energy impulse is recorded over a certain geographic domain. This disclosure relates to methods of inverting the data recorded by the receivers 110 into a representation of the physical properties of the earth in the surveyed area.

In a typical geophysical survey process, a raw data set d that represents energy signatures recorded over a domain $\Omega$ for an area of the earth O is captured by the receivers 110. Inversion seeks to model the physical response of the area O having physical properties m to energy perturbations based on estimates of the physical properties m selected to reproduce the raw data set d as closely as possible. The raw data set d may be a zero-rank quantity, for instance a scalar quantity, or a higher-rank quantity, such as a vector or tensor, and is dimensioned over a location variable x, which is typically a 3-vector, but may be any desired dimensionality. In this specification, bold face type represents non-scalar quantities. The location variable x typically covers the subsurface region of the earth. The set m of physical properties may also be a scalar or non-scalar quantity, for example if more than one physical property is being esti-mated from the raw data set d. In the general case, the raw data set is a vector or tensor d(x), and the physical properties set is a vector or tensor m(x).

The physical properties m are related to the raw data set d by some theoretical function:

$$d=f(m),$$

which is usually an algebraic function, and which may be linear or non-linear. From this function, an estimate d of the data set d may be computed from an estimate m of the physical properties m. The error may then be computed as e(x)=d(x)−d(x). Error may be defined as a vector in this case to account for collecting more than one type of data in a survey, so that a vector model f generates a data estimate vector d(x). In a typical inversion process, successive physical property estimates $m_i$ are computed or otherwise defined, optionally as a function of the error e or some other parameter, successive estimated data sets $d_i$ are computed, and successive errors $e_i$ are derived. In some embodiments, the inversion is said to converge when an error $e_i$ reaches some threshold or criterion.

Figure 2:
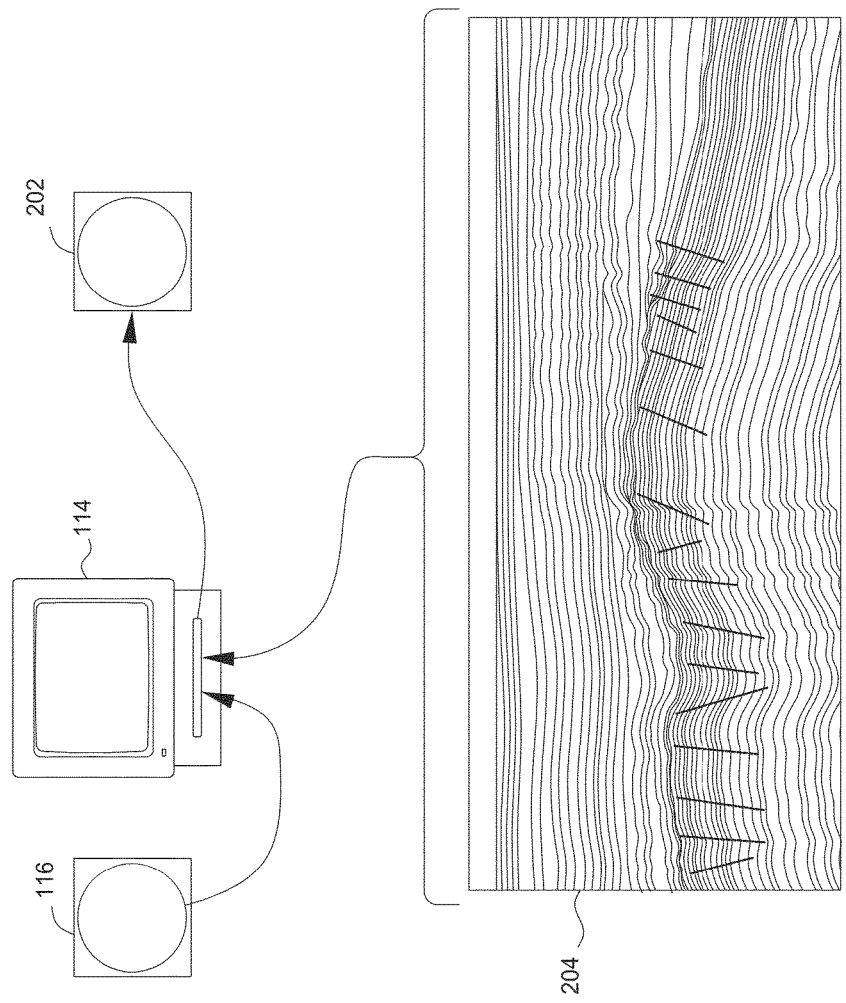
FIG. 2 is an example activity diagram showing a scheme for recovering a geologic map by performing a seismic guided inversion process on the electromagnetic data set according to one embodiment.

FIG. 2 is an example activity diagram showing a scheme for recovering a geologic map by performing a seismic guided inversion process on the electromagnetic data set according to one embodiment. The recorded energy signatures are stored in a computer 114 or on a computer readable medium 116. The recorded electromagnetic data set is entered into the computer processing system 114 before the inversion process starts. During the process of electromagnetic inversion, a seismic stratigraphic structure 204 obtained from the recorded seismic data set is entered into the computer processing system 114, to guide the electromagnetic inversion by confining the inverted resistivity map.

The recorded seismic data may be obtained at the same time, in the same acquisition, as the recorded electromagnetic data set, or at a different time in a different acquisition. For example, obtaining the seismic data may involve merely receiving the seismic data, apart from any prior acquisition activity. In some cases, the seismic data is recorded at an offshore location and then transmitted to an onshore location for processing. In such cases, obtaining the seismic data may refer to the onshore location receiving the data for processing.

A geologic map is resolved from the finally inverted resistivity map, and may then be stored on another computer readable medium 202. The resistivity map may also be stored on the computer readable medium 202. In general, the data product stored on the computer readable medium 202 may include any or all of the resistivity map, the geologic map, and computer processing instructions for processing one or both of the resistivity map and the geologic map.

In a seismic guided inversion scenario, the physical properties m are related to the raw data set d by the modified function:

$$d=f(m;I),$$

wherein I is a seismic data set that represents the inserted seismic stratigraphic structure 204. From this modified function, an estimate d of the data set d may be computed from an estimate m of the physical properties m, coupled with the seismic data set I. In a typical iterative inversion process, the seismic stratigraphic structure 204, represented by the seismic data set I, remains unchanged. The seismic stratigraphic structure 204, typically obtained prior to the iterative electromagnetic inversion process through seismic imaging, indicates potential geologic boundaries, and hence, guides the inverted physical properties m to follow those geologic boundaries during iterations.

Figure 3:
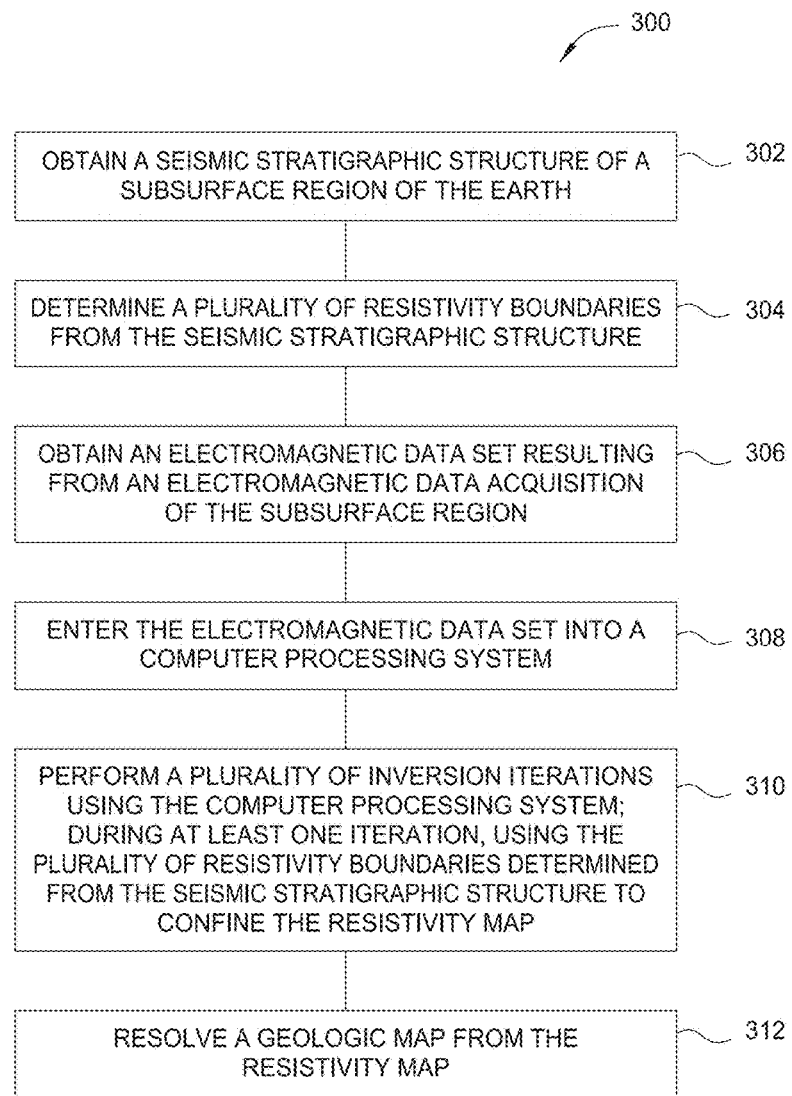
FIG. 3 is a flowchart summarizing a method according to one embodiment.

FIG. 3 is a flow diagram summarizing a method 300 according to one embodiment. The method 300 is a method of forming a geologic map, including obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; entering the electromagnetic data set into a computer processing system; performing a plurality of inversion iterations using the computer processing system; during at least one iteration, using one or more of the plurality of resistivity boundaries determined from the seismic stratigraphic structure to confine the resistivity map; and resolving a geologic map from the resistivity map.

At 302, a seismic stratigraphic structure 204 of a subsurface region of the earth is obtained. As noted above in connection with FIG. 1, one or more of the sources 106 may emit seismic energy propagating into the interior of the subsurface region. One or more of the receivers 110 may be seismic receivers that detect energy signatures and then record energy signatures as a seismic data set. In one embodiment, a broadband dual sensor seismic data set is acquired by the so-called broadband dual sensor Geo-Streamer® acquisition technology available from Petroleum GeoServices, Inc., of Oslo, Norway. Data may also be acquired using apparatus available from other manufacturers. In addition, the broadband dual sensor survey may be towed simultaneously with the towed streamer electromagnetic survey, which significantly reduces acquisition costs.

In this scenario, as noted above in connection with FIG. 1, the source assemblies 104 consist of both seismic and electromagnetic sources 106, and the receiver assemblies 108 consist of both seismic and electromagnetic receivers 110. A typical workflow of processing seismic data set to obtain a seismic stratigraphic structure includes building a seismic velocity model via tomography-based methods or waveform inversion-based methods, and applying a seismic imaging technique, such as reverse time migration or one-way wave equation migration, using the recorded seismic data set and velocity model that has been built. Due to the broadband nature of seismic data, the obtained seismic stratigraphic structure is typically of high resolution, which may delineate geologic layers and convey physical properties of rocks.

At 304, a plurality of potential resistivity boundaries is determined from the seismic stratigraphic structure. In one embodiment, because resistivity and seismic data describe physical properties of the same subsurface region, resistivity boundaries are expected to roughly align with the boundaries delineated by the seismic stratigraphic structure. Seismic interpretation processes may interpret resistivity boundaries directly from the seismic stratigraphic structure. In another embodiment, resistivity boundaries are numerical limits on the value of resistivity at each location of the subsurface region determined from assessment of rock types in the seismic stratigraphic structure. Seismic interpretation of the seismic stratigraphic structure may deliver the information of rock type, and hence, provide physical properties of the rocks. For instance, seismic interpretation may be applied to determine a rock type of a certain layer of the stratigraphic structure, for example shale. Because the range of resistivity of shale is known, the numerical limits of resistivity within that layer may be accordingly assigned to the known range for shale. Therefore, resistivity boundaries are determined from the seismic stratigraphic structure.

At 306, an electromagnetic data set resulting from an electromagnetic data acquisition of the subsurface region is obtained. The electromagnetic data set may be obtained at the same time as the seismic stratigraphic structure, or at a different time. For example, the seismic and electromagnetic data may be acquired using a simultaneous seismic and electromagnetic acquisition, or the seismic and electromagnetic data may be acquired during different acquisitions at different times. A typical electromagnetic inversion is performed in the frequency domain instead of in the time domain. In addition, most desired information may be resolved from electromagnetic inversion using a sparse set of frequencies, such as 0.2 Hz, 0.4 Hz, 0.6 Hz, 0.8 Hz, 1.0 Hz, and 1.2 Hz. An acquired electromagnetic data set is typically transformed to the frequency domain by Fourier Transform, or other frequency transform, of the recorded electromagnetic energy stored on 116. In this regard, "obtaining" may refer to receiving a data set that was previously acquired in a geophysical survey, or "obtaining" may refer to creating the data set in a geophysical survey.

At 308, an inversion process on the electromagnetic data set seeking to recover a resistivity map of the subsurface region starts by entering the electromagnetic data set into a computer processing system 114, as noted above in connection with FIG. 1 and FIG. 2. Due to large volumes of data processed generally in an inversion, the map of geophysical properties is typically recovered using a computer processor. The electromagnetic data d read into the computer processing system 114 typically remains unchanged during iterations of inversion. As noted above, the inversion is said to converge when an error between the computed data d and the recorded data d reaches some threshold or criterion.

At 310, a plurality of inversion iterations are performed using the computer processing system, and during at least one iteration, one or more of the plurality of resistivity boundaries determined from the seismic stratigraphic structure, as noted above in 304, is used to confine the resistivity map. In one embodiment, the inversion process may be independent of any a priori resistivity model. In another embodiment, the inversion process may start with a resistivity map obtained from the unconstrained electromagnetic inversion. In one embodiment, the plurality of resistivity boundaries may remain unchanged during the inversion process because the seismic stratigraphic structure is kept unchanged. During iterations, the unchanged resistivity boundaries confine the updates of the resistivity map, and hence, guide the inverted resistivity map to align with the potential geologic boundaries indicated by the seismic stratigraphic structure.

In one embodiment, the plurality of resistivity boundaries is determined by assessment of rock types in the seismic stratigraphic structure, and each inversion iteration comprises determining a resistivity model adjustment, including a sub-process of comparing the resistivity map to the plurality of resistivity boundaries to define an envelope; comparing the resistivity model adjustment to the envelope; identifying any component of the resistivity model adjustment lying outside the envelope; and replacing the components of the resistivity model adjustment lying outside the envelope with corresponding values of the envelope. For example, interpretations of the seismic stratigraphic structure indicate that a certain layer of the subsurface region may mainly consist of shales. In addition, it is known that the resistivity value of given shales may vary between $V_1$ and $V_2$. Thus, $[V_1, V_2]$ defines an envelope associated with that layer delineated by the seismic stratigraphic structure. At each iteration of the inversion process, if certain values of the inverted resistivity within that layer fall outside the [$V_1$, $V_2$] envelope, they are replaced by corresponding values of the envelope.

In another embodiment, the plurality of resistivity boundaries is determined by computing eigen-vectors of the seismic stratigraphic structure, and each inversion iteration comprises determining a resistivity model adjustment, including computing a numerical gradient of the seismic stratigraphic structure $\nabla I$; forming a structure tensor by multiplying the gradient vector with the transpose of the gradient vector $T=\nabla I \cdot \nabla I^T$; computing the eigen-decomposition of the structure tensor to obtain eigen-vectors $T=\mu_1 uu^T + \mu_2 vv^T$, which indicates resistivity boundaries; and using the computed eigen-vectors u and v to confine the resistivity map, for example by computing maximum and minimum resistivity differences at each location such that a gradient of resistivity is arbitrarily close to the gradient of the stratigraphic structure, and to determine a resistivity model adjustment.

At 312, a geologic map is resolved from the resistivity map. Resistivity anomaly regions on the inverted resistivity map indicate potential locations of hydrocarbon reservoirs and/or locations unlikely to have such reservoirs. Seismic and/or other geological data interpretation may help identify non-hydrocarbon high-resistivity anomalies in these locations. Therefore, those resistivity anomaly regions are mapped onto a geologic map for making subsequent drilling decisions. The geologic map may be resolved by plotting a color or shade corresponding to a resistivity value, for example. A data product containing the resolved geologic map may be formed using the method 300. The data product may be stored on a computer readable medium, such as the computer readable medium 202.

Figure 4:
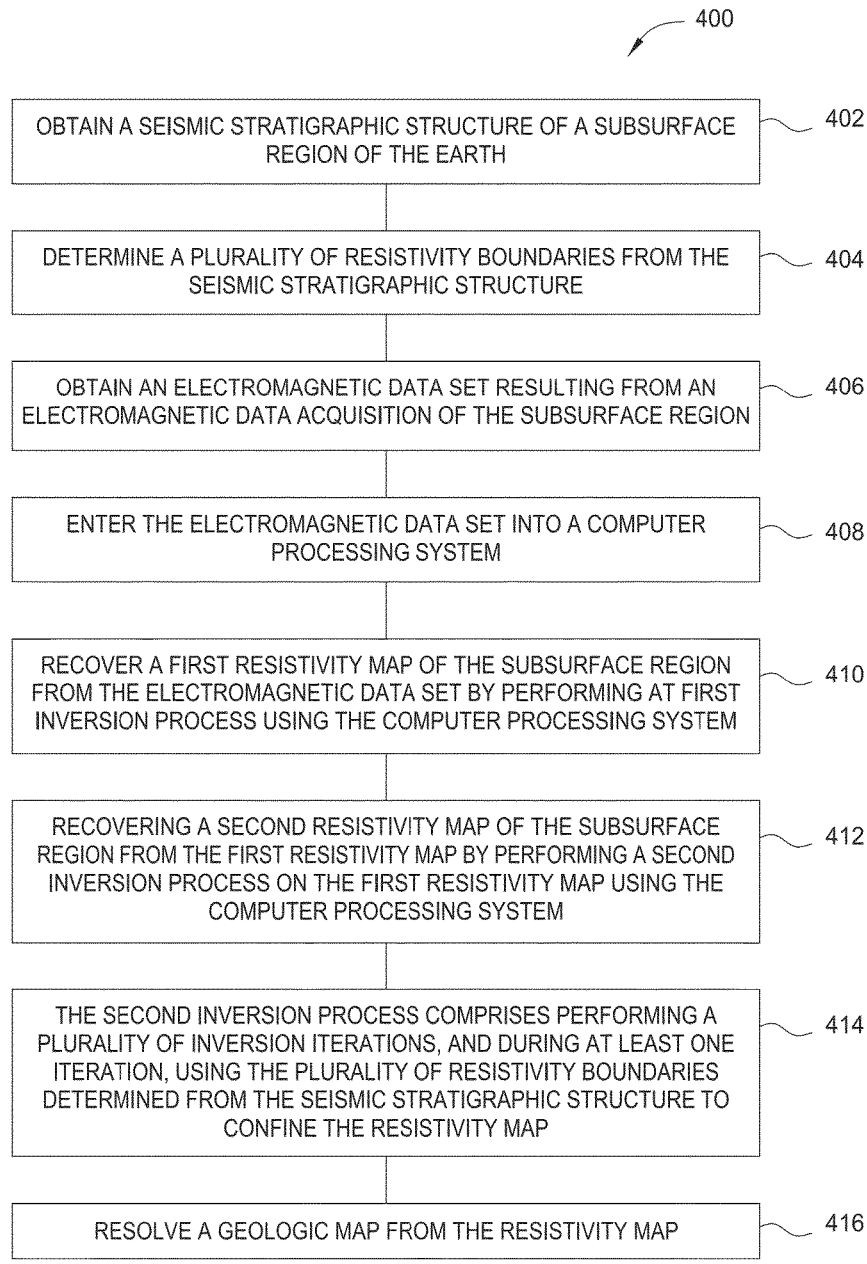
FIG. 4 is a flowchart summarizing a method according to another embodiment.

FIG. 4 is a flow diagram summarizing a method 400 according to one embodiment. The method 400 is a method of forming a geologic map, including obtaining a seismic stratigraphic structure of a subsurface region of the earth; determining a plurality of potential resistivity boundaries from the seismic stratigraphic structure; obtaining an electromagnetic data set resulting from an electromagnetic data acquisition of the subsurface region; entering the electromagnetic data set into a computer processing system; recovering a first resistivity map of the subsurface region from the electromagnetic data set by performing a first inversion process using the computer processing system; recovering a second resistivity map of the subsurface region from the first resistivity map by performing a second inversion process on the first resistivity map using the computer processing system; and resolving a geologic map from the second resistivity map. The geologic map is typically usable to identify prospective resource accumulations beneath the earth visually and/or numerically.

At 402, a seismic stratigraphic structure of a subsurface region of the earth is obtained in the same manner as described at 302. At 404, a plurality of potential resistivity boundaries is determined from the seismic stratigraphic structure in the same manner as described at 304. At 406, an electromagnetic data set resulting from an electromagnetic data acquisition of the subsurface region is obtained in the same manner as described at 306. At 408, the electromagnetic data set is entered into a computer processing system in the same manner as described at 308.

At 410, a first resistivity map of the subsurface region is recovered from the electromagnetic data set by performing a first inversion process using the computer processing system. In one embodiment, the first inversion process is independent of any a priori resistivity model, and is purely an electromagnetic inversion process without taking into account the seismic stratigraphic structure. Within each iteration of the first inversion process, forward propagations $U_S$ of electromagnetic wave fields from source locations 106 are computed, backward propagations $U_R$ of data residues from receiver locations 110 are computed, and then resistivity model updates are computed by cross correlating source fields with receiver fields (in the frequency domain, the cross-correlation takes the concise form of directly multiplying source and receiver fields at each single frequency: $U_S \cdot U_R$). The first inversion process is sometimes referred to as an "unconstrained" electromagnetic inversion, which results in the first resistivity map after a certain number of iterations, using only the electromagnetic data set that is entered into the computer processing system at 408. The recovered first resistivity map is typically of low resolution because the electromagnetic data set used for electromagnetic iterative inversion is typically of low frequency, instead of broadband.

At 412 and 414, a second resistivity map of the subsurface region is recovered from the first resistivity map by performing a second inversion process on the first resistivity map using the computer processing system, the second inversion process comprising performing a plurality of inversion iterations, and during at least one iteration using one or more of the plurality of resistivity boundaries determined from the seismic stratigraphic structure to confine the resistivity map. Although the methodologies here at 412 and 414 are similar to the methodologies described at 310, one difference is that the second inversion process at 412 and 414 uses information from the first resistivity map recovered at 410, whereas the inversion process at 310 is independent of an a priori resistivity model. In one embodiment, within each iteration of the second inversion process, the lowest and highest average resistivities computed on the first resistivity map may be used to estimate the lower and upper resistivity boundaries. The estimated smallest and the largest values between the horizontal and vertical boundaries in each layer may be used to form only one set of the lower and upper boundaries for both vertical and horizontal resistivities inversions.

At 416, a geologic map is resolved from the second resistivity map. Resistivity anomaly regions on the inverted resistivity map typically indicate potential locations of hydrocarbon reservoirs. Resistivity anomalies may also correspond to high resistivity lithologies, such as intrusive igneous rocks, tight clastic rocks, or non-clastic rocks. Seismic and/or other geological data interpretation may be used to help identify non-hydrocarbon high-resistivity anomalies in these locations. Therefore, those resistivity anomaly regions are mapped onto a geologic map for making subsequent drilling decisions. The geologic map may be resolved by plotting a color or shade corresponding to a resistivity value, for example. A data product containing the resolved geologic map may be formed using the method 400. The data product may be stored on a computer readable medium, such as the computer readable medium 202.

Figure 5:
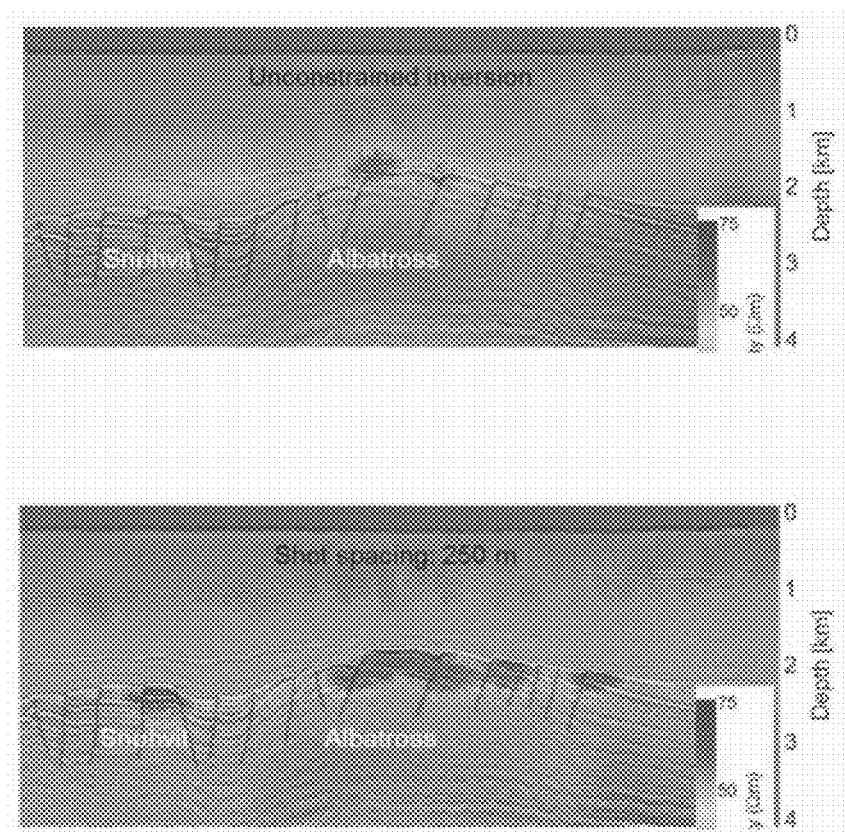
FIG. 5 is a graphical example demonstrating the method summarized in FIG. 4.

FIG. 5 displays a numerical example demonstrating the method summarized in FIG. 4. FIG. 5 top shows a first resistivity map recovered from the unconstrained electromagnetic inversion process described at 410, without incorporating the seismic stratigraphic structure. A resistivity anomaly region is inverted, whose boundaries, however, do not align with the seismic stratigraphic structure. In contrast, FIG. 5 bottom shows a second resistivity map recovered from the seismic guided inversion process described at 412 and 414, using the set of lower and upper boundaries from the first resistivity map described above to populate the regions confined by the seismic stratigraphic structure to guide the resistivity map updates. It can be observed that the resistivity anomaly region is further updated, whose boundaries now align well with the seismic stratigraphic structure.

The geologic map recovered by any of the methods described herein may be formed into a geologic map product containing a representation of the geologic map. The geologic map product may be formed by storing the representation of the geologic map in a non-transitory medium, which may be readable by computer, for example the computer readable medium 116 of FIG. 1. Thus, the computer-readable medium 116, with a geologic map resulting from any of the methods described herein stored thereon, is an exemplary geologic map product. Other exemplary geologic map products are a flash memory medium containing an electronic representation of the geologic map; and a paper representation of the geologic map. A representation of the geologic map may be stored in a computer system for electronic deployment as a geologic map product. In some embodiments, the representation of the geologic map may be stored in a non-transitory medium.

While the foregoing is directed to aspects of the present disclosure, other and further aspects of the disclosure may be devised without departing from the basic scope thereof, and the scope thereof is determined by the claims that follow.

What is claimed is:

1. A method of forming a geologic map, comprising:
   obtaining a seismic stratigraphic structure of a subsurface region of the earth;
   determining a plurality of potential resistivity boundaries from the seismic stratigraphic structure;
   obtaining an electromagnetic data set resulting from an electromagnetic data acquisition of the subsurface region;
   recovering a resistivity map of the subsurface region by performing an inversion process on the electromagnetic data set, the inversion process comprising:
      entering the electromagnetic data set into a computer processing system;
      performing a plurality of inversion iterations using the computer processing system; and
      during at least one iteration, using one or more of the plurality of potential resistivity boundaries determined from the seismic stratigraphic structure to confine the resistivity map; and
   resolving a geologic map from the resistivity map.

2. The method of claim 1, wherein the electromagnetic data acquisition is a towed streamer controlled-source electromagnetic data acquisition.

3. The method of claim 2, wherein the seismic stratigraphic structure is obtained by processing a broadband dual sensor seismic data set.

4. The method of claim 1, wherein the resistivity boundaries are numerical limits on the value of resistivity at each location of the subsurface region determined from assessment of rock types in the seismic stratigraphic structure, each inversion iteration comprises determining a resistivity model adjustment, and the plurality of potential resistivity boundaries determined from the seismic stratigraphic structure are used to confine the resistivity map by a sub-process, comprising:
   comparing the resistivity map to the plurality of potential resistivity boundaries to define an envelope;
   comparing the resistivity model adjustment to the envelope;
   identifying any components of the resistivity model adjustment lying outside the envelope; and
   replacing the components of the resistivity model adjustment lying outside the envelope with corresponding values of the envelope.

5. The method of claim 4, wherein the plurality of potential resistivity boundaries remains unchanged during the inversion process.

6. The method of claim 5, wherein the inversion process is independent of any a priori resistivity model.

7. The method of claim 1, wherein the plurality of potential resistivity boundaries are determined by assessment of rock types in the seismic stratigraphic structure.

8. A method of forming a geologic map, comprising:
   obtaining a seismic stratigraphic structure of a subsurface region of the earth;
   determining a plurality of potential resistivity boundaries from the seismic stratigraphic structure;
   obtaining an electromagnetic data set resulting from an electromagnetic data acquisition of the subsurface region;
   entering the electromagnetic data set into a computer processing system;
   recovering a first resistivity map of the subsurface region from the electromagnetic data set by performing a first inversion process using the computer processing system;
   recovering a second resistivity map of the subsurface region from the first resistivity map by performing a second inversion process on the first resistivity map using the computer processing system, the second inversion process comprising:
      performing a plurality of inversion iterations; and
      during at least one iteration, using one or more of the plurality of potential resistivity boundaries determined from the seismic stratigraphic structure to confine the resistivity map; and
   resolving a geologic map usable for identifying prospective resource accumulations from the second resistivity map.

9. The method of claim 8, wherein the electromagnetic data acquisition is a towed streamer controlled-source electromagnetic data acquisition.

10. The method of claim 9, wherein the seismic stratigraphic structure is obtained by processing a broadband dual sensor seismic data set.

11. The method of claim 8, wherein the resistivity boundaries are numerical limits on the value of resistivity at each location of the subsurface region, each inversion iteration comprises determining a resistivity model adjustment, and the plurality of potential resistivity boundaries determined from the seismic stratigraphic structure are used to confine the resistivity map by a sub-process, comprising:
   comparing the resistivity map to the plurality of potential resistivity boundaries to define an envelope;
   comparing the resistivity model adjustment to the envelope;
   identifying any components of the resistivity model adjustment lying outside the envelope; and
   replacing the components of the resistivity model adjustment lying outside the envelope with corresponding values of the envelope.

12. The method of claim 11, wherein the plurality of potential resistivity boundaries remains unchanged during the second inversion process.

13. The method of claim 12, wherein the first inversion process is independent of any a priori resistivity model.

14. A geologic map product, obtained by a process comprising:
- obtaining a seismic stratigraphic structure of a subsurface region of the earth;
- determining a plurality of potential resistivity boundaries from the seismic stratigraphic structure;
- obtaining an electromagnetic data set resulting from an electromagnetic data acquisition of the subsurface region;
- recovering a resistivity map of the subsurface region by performing an inversion process on the electromagnetic data set, the inversion process comprising:
    - entering the electromagnetic data set into a computer processing system;
    - performing a plurality of inversion iterations using the computer processing system; and
    - during at least one iteration, using one or more of the plurality of potential resistivity boundaries determined from the seismic stratigraphic structure to confine the resistivity map;
- resolving a geologic map usable for identifying prospective resource accumulations from the resistivity map; and
- forming a geologic map product containing a representation of the geologic map.

15. The product of claim 14, wherein the electromagnetic data acquisition is a towed streamer controlled-source electromagnetic data acquisition.

16. The product of claim 15, wherein the seismic stratigraphic structure is obtained by processing a broadband dual sensor seismic data set.

17. The product of claim 14, wherein the resistivity boundaries are numerical limits on the value of resistivity at each location of the subsurface region determined from assessment of rock types in the seismic stratigraphic structure, each inversion iteration comprises determining a resistivity model adjustment, and the plurality of potential resistivity boundaries determined from the seismic stratigraphic structure are used to confine the resistivity map by a sub-process, comprising:
- comparing the resistivity map to the plurality of potential resistivity boundaries to define an envelope;
- comparing the resistivity model adjustment to the envelope;
- identifying any components of the resistivity model adjustment lying outside the envelope; and
- replacing the components of the resistivity model adjustment lying outside the envelope with corresponding values of the envelope.

18. The product of claim 17, wherein the plurality of potential resistivity boundaries remains unchanged during the inversion process.

19. The product of claim 18, wherein the inversion process is independent of any a priori resistivity model.

20. The product of claim 14, wherein the plurality of potential resistivity boundaries are determined by assessment of rock types in the seismic stratigraphic structure.

21. A geologic map product for identifying prospective resource accumulations beneath the earth, the geologic map product obtained by a process comprising:
- obtaining a seismic stratigraphic structure of a subsurface region of the earth;
- determining a plurality of potential resistivity boundaries from the seismic stratigraphic structure;
- obtaining an electromagnetic data set resulting from an electromagnetic data acquisition of the subsurface region;
- entering the electromagnetic data set into a computer processing system;
- recovering a first resistivity map of the subsurface region from the electromagnetic data set by performing a first inversion process using the computer processing system;
- recovering a second resistivity map of the subsurface region from the first resistivity map by performing a second inversion process on the first resistivity map using the computer processing system, the second inversion process comprising:
    - performing a plurality of inversion iterations; and
    - during at least one iteration, using one or more of the plurality of potential resistivity boundaries determined from the seismic stratigraphic structure to confine the resistivity map;
- resolving a geologic map from the second resistivity map; and
- forming a geologic map product containing a representation of the geologic map.

22. The product of claim 21, wherein the electromagnetic data acquisition is a towed streamer controlled-source electromagnetic data acquisition.

23. The product of claim 22, wherein the seismic stratigraphic structure is obtained by processing a broadband dual sensor seismic data set.

24. The product of claim 21, wherein the resistivity boundaries are numerical limits on the value of resistivity at each location of the subsurface region, each inversion iteration comprises determining a resistivity model adjustment, and the plurality of potential resistivity boundaries determined from the seismic stratigraphic structure are used to confine the resistivity map by a sub-process, comprising:
- comparing the resistivity map to the plurality of potential resistivity boundaries to define an envelope;
- comparing the resistivity model adjustment to the envelope;
- identifying any components of the resistivity model adjustment lying outside the envelope; and
- replacing the components of the resistivity model adjustment lying outside the envelope with corresponding values of the envelope.

25. The product of claim 24, wherein the plurality of potential resistivity boundaries remains unchanged during the second inversion process.

26. The product of claim 25, wherein the first inversion process is independent of any a priori resistivity model.

* * * * *